US012183506B2

(12) United States Patent
Xu et al.

(10) Patent No.: US 12,183,506 B2
(45) Date of Patent: Dec. 31, 2024

(54) WINDING METHOD FOR FOIL COIL

(71) Applicant: HAIHONG ELECTRIC CO., LTD., Guangdong (CN)

(72) Inventors: Kaixuan Xu, Guangdong (CN); Qingning Liang, Guangdong (CN); Dengling Zhou, Guangdong (CN); Shujing Zhang, Guangdong (CN); Libo Zhou, Guangdong (CN); Huilin Guan, Guangdong (CN); Yixiong Liang, Guangdong (CN)

(73) Assignee: HAIHONG ELECTRIC CO., LTD., Guangdong (CN)

(*) Notice: Subject to any disclaimer, the term of this patent is extended or adjusted under 35 U.S.C. 154(b) by 0 days.

(21) Appl. No.: 17/762,905

(22) PCT Filed: Nov. 10, 2021

(86) PCT No.: PCT/CN2021/129882

§ 371 (c)(1),
(2) Date: Mar. 23, 2022

(87) PCT Pub. No.: WO2023/029212

PCT Pub. Date: Mar. 9, 2023

(65) Prior Publication Data

US 2024/0055180 A1 Feb. 15, 2024

(30) Foreign Application Priority Data

Aug. 31, 2021 (CN) ........................ 202111011053.X

(51) Int. Cl.
*H01F 7/06* (2006.01)
*H01F 41/06* (2016.01)

(52) U.S. Cl.
CPC .................................. *H01F 41/06* (2013.01)

(58) Field of Classification Search
CPC ............................... H01F 41/06; H01F 41/061
See application file for complete search history.

(56) References Cited

U.S. PATENT DOCUMENTS

| | | | | |
|---|---|---|---|---|
| 4,544,906 A * | 10/1985 | Mota | H01F 5/06 336/208 |
| 9,190,205 B2 * | 11/2015 | Outten | H01F 30/12 |
| 2012/0139678 A1 * | 6/2012 | Outten | H01F 30/12 29/605 |

FOREIGN PATENT DOCUMENTS

| | | |
|---|---|---|
| CN | 109378207 A | 2/2019 |
| CN | 111653426 A | 9/2020 |

(Continued)

OTHER PUBLICATIONS

Tapan Kumar Saha et al.; Transformer Insulation Materials and Ageing; Transformer Ageing: Monitoring and Estimation Techniques; First Edition; Published by Jon Wiley & Sons Singapore Pte. Ltd.; 2017; pp. 1-33.

(Continued)

*Primary Examiner* — Paul D Kim

(74) *Attorney, Agent, or Firm* — Renner, Otto, Boisselle & Sklar, LLP

(57) ABSTRACT

A winding method for a foil coil includes the following process steps of, step S1: fixing an iron core, and preparing a winding die; step S2: calculating a circumference of a foil needed by each layer of coil; step S3: making one size mark on the foil at every regular interval; step S4: arranging the foil on a winding device; step S5: fixing a start end of the coil, and arranging a reference point on a transformer; step S6: starting to wind the coil; step S7: checking whether the winding meets a preset standard requirement; and step S8: fixing a tail end of the coil.

5 Claims, 1 Drawing Sheet

(56) References Cited

FOREIGN PATENT DOCUMENTS

| | | | |
|---|---|---|---|
| CN | 112233900 | A | 1/2021 |
| JP | 2000182869 | A | 6/2000 |
| JP | 2009277929 | A | 11/2009 |

OTHER PUBLICATIONS

International Search Report mailed Mar. 29, 2022, for International Application No. PCT/CN2021/129882.
Written Opinion mailed Mar. 29, 2022, for International Application No. PCT/CN2021/129882.
Search Report dated Mar. 2, 2022, for Chinese Application No. 202111011053X.

* cited by examiner

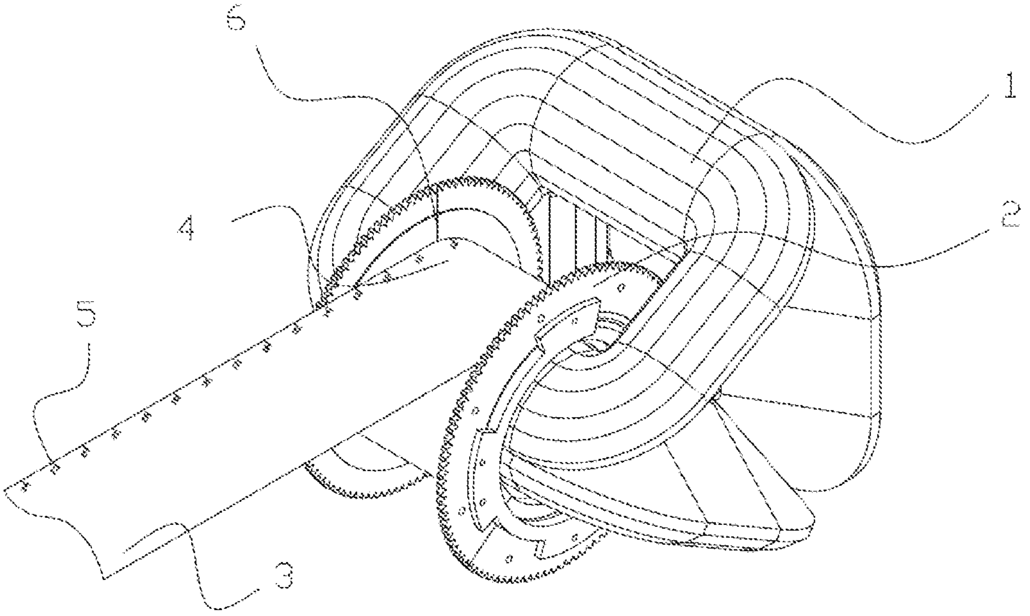
6
1
4
2
5
3

WINDING METHOD FOR FOIL COIL

This application is a national stage filing under 35 U.S.C. § 371 of international application number PCT/CN2021/129882, filed Nov. 10, 2021, which claims priority to Chinese patent application No. 202111011053.X, filed Aug. 31, 2021. The contents of these applications are incorporated herein by reference in their entireties.

TECHNICAL FIELD

The present disclosure relates to the field of transformer technologies, and more particularly, to a winding method for a foil coil.

BACKGROUND

With the development of transformer industry, the competition is becoming higher, and all production enterprises are paying more and more attention to their own product process innovation, improving product performance and quality, controlling material consumption and reducing production management cost, so as to improve the market competitiveness of products.

Transformer, as a main power transformation device in an electrical power system, requires a certain anti-short circuit capability, and a foil coil has advantages in material cost, labor cost and anti-short circuit performance as compared with a traditional wire-wound coil, thus being favored.

A foil of the foil coil is generally long, so that it is not easy to control a length of a material. In addition, a width of the foil is large, so that there is usually only one turn for each layer of coil. Therefore, a short-circuit force of the foil coil in an axial direction is almost negligible. However, due to a large number of layers of the foil coil, an interlayer gap is easy to appear due to the loose winding during the winding process, and the foil is usually thin, so that when a short circuit occurs, the short-circuit force is easy to cause deformation and displacement of the foil. Therefore, there is a need for a process for controlling consumption of the foil coil and the compactness during the winding process, so as to ensure accurate control of the material of the coil and improve an anti-short circuit capability of the coil.

SUMMARY

The present disclosure aims to solve at least one of the technical problems in the prior art. Therefore, the present disclosure provides a winding method for a foil coil to ensure accurate control of materials of the coil and improve an anti-short circuit capability of the coil.

A winding method for a foil coil of the present disclosure comprises the following process steps of:

- step S1: fixing an iron core onto a winding device, and then preparing a winding die, in which the winding die is of a hollow structure, and the winding die is sleeved around a core post of the iron core;
- step S2: measuring an actual size of each of the iron core, the winding die, a foil and an insulating material, and calculating a circumference of the foil needed by each layer of coil;
- step S3: making one size mark on the foil at every regular interval;
- step S4: arranging the foil on the winding device;
- step S5: fixing a start end of the coil, and arranging a reference point on a transformer;
- step S6: starting to wind the coil, when the reference point being reached as the coil being wound, measuring a distance between the foil at the reference point and the closest mark, and calculating a circumference of the foil actually wound up by the layer of coil;
- step S7: comparing the circumference of the foil actually wound up in step S6 with the circumference of the foil calculated in step S2, if a preset standard requirement is met, winding continuously, and if the preset standard requirement is not met, adjusting until the process standard requirement is met; and
- step S8: after finishing winding, fixing a tail end of the coil.

The winding method for the foil coil according to the embodiment of the present disclosure at least has the following beneficial effects: the winding method can control a winding compactness of each layer of coil to ensure an anti-short circuit capability of the coil, and can also adjust production materials of subsequent products to realize accurate control of materials; and meanwhile, the winding method also reserves actual data for subsequent product performance analysis.

According to some embodiments of the present disclosure, the winding die in the step S1 comprises a left die, a middle die and a right die, and the middle die is connected between the left die and the right die.

According to some embodiments of the present disclosure, the distance in the step S3 is ranged from 50 mm to 100 mm.

According to some embodiments of the present disclosure, the reference point 6 in step S5 is arranged at a start end of the coil.

According to some embodiments of the present disclosure, the standard requirement in step S7 is ranged from 0 mm to 3 mm.

The additional aspects and advantages of the present disclosure will be given in part in the following description, and will become apparent in part from the following description, or will be learned through the practice of the present disclosure.

BRIEF DESCRIPTION OF DRAWINGS

The present disclosure is further described hereinafter with reference to the accompanying drawings and the embodiments, wherein:

FIG. 1 is a schematic structural diagram of winding of the present disclosure.

DETAILED DESCRIPTION

The embodiments of the present disclosure are described in detail hereinafter, and the examples of the embodiments are shown in the accompanying drawings, wherein the same or similar reference numerals throughout the accompanying drawings denote the same or similar elements or elements having the same or similar functions. The embodiments described hereinafter with reference to the accompanying drawings are exemplary, and are only intended to explain the present disclosure, but should not be understood as limiting the present disclosure.

In the description of the present disclosure, it should be understood that the orientation or position relation related to the orientation description, such as the orientation or position relation indicated by "upper", "lower", etc., is based on the orientation or position relation shown in the accompanying drawings, which is only used for convenience of description of the present disclosure and simplification of description instead of indicating or implying that the indicated device or element must have a specific orientation, and be constructed and operated in a specific orientation, and thus should not be understood as a limitation to the present disclosure.

In the description of the present disclosure, "multiple" refers to being more than two. If there are descriptions of "first" and "second", it is only for the purpose of distinguishing technical features, and should not be understood as indicating or implying relative importance, implicitly indicating the number of the indicated technical features or implicitly indicating the order of the indicated technical features.

In the description of the present disclosure, unless otherwise clearly defined, the terms such as "setting", "mounting" and "connection" should be understood broadly, and those skilled in the art can reasonably determine the specific meanings of the above terms in the present disclosure in combination with the specific contents of the technical solutions.

With reference to FIG. 1, a winding method for a foil coil includes the following process steps.

In step S1, an iron core 1 is fixed onto a winding device, and then a winding die 2 is prepared. The winding die 2 is of a hollow structure, and the winding die 2 is sleeved around a core post of the iron core 1. The winding die includes a left die, a middle die and a right die, and the middle die is connected between the left die and the right die.

In step S2, an actual size of each of the iron core 1, the winding die 2, a foil 3 and an insulating material is measured, and a circumference of the foil 3 needed by each layer of coil 4 is calculated.

In step S3, a size mark 5 is made on the foil 3 at a regular interval. The interval is 50 mm to 100 mm, and is preferably 50 mm.

In step S4, the foil 3 is arranged on the winding device.

In step S5, a start end of the coil 4 is fixed, and a reference point 6 is arranged on a transformer. The reference point 6 may be arranged at any position on the transformer, and is generally arranged at the start end of the coil 4.

In step S6, the coil 4 starts to be wound, when the reference point 6 is reached as the coil 4 is wound, a distance between the foil at the reference point 6 and the closest mark 5 is measured, and a circumference of the foil 3 that is actually wound up by the layer of coil 4 is calculated.

In step S7, the circumference of the foil 3 that is actually wound up calculated in the step S6 is compared with the circumference of the foil 3 calculated in step S2, if a preset standard requirement is met, the winding is continued, and if the preset standard requirement is not met, adjustment is performed until the process standard requirement is met. The standard requirement is 0 mm to 3 mm.

In step S8, after finishing winding, a tail end of the coil 4 is fixed.

The winding method above can control a winding compactness of each layer of coil 4 to ensure an anti-short circuit capability of the coil 4, and can also adjust production materials of subsequent products to realize accurate control of materials; and meanwhile, the winding method also reserves actual data for subsequent product performance analysis.

Some embodiments of the present disclosure are described in detail above. It should be understood that those of ordinary skills in the art may make many modifications and changes according to the concept of the present disclosure without going through creative works. Therefore, all technical solutions that can be obtained by those skilled in the art through logical analysis, reasoning or limited experiments based on the prior art according to the concept of the present disclosure should be within the scope of protection determined by the claims.

The invention claimed is:

1. A method for winding a foil to form a coil, comprising following process steps of:

step S1: fixing an iron core (1) onto a winding device, and then preparing a winding die (2), wherein the winding die (2) is of a hollow structure, and the winding die (2) is sleeved around a core post of the iron core (1);

step S2: measuring an actual size of each of the iron core (1), the winding die (2), a foil (3) and an insulating material arranged between every two layers of coil (4) eventually formed to prevent layer short circuit, and calculating a circumference of the foil (3) needed by each layer of coil (4) eventually formed;

step S3: making one size mark (5) on the foil (3) at every regular interval;

step S4: arranging the foil (3) on the winding device;

step S5: fixing a start end of the foil (3), and arranging a reference point (6) on the winding die (2);

step S6: starting to wind the foil (3), and when the reference point (6) being reached as a layer of the foil (3) being wound, measuring a distance between the foil at the reference point (6) and the mark (5) closest thereto, and calculating a circumference of the foil (3) actually wound up by the layer of foil (3);

step S7: comparing the circumference of the foil (3) actually wound up calculated in step S6 with the circumference of the foil (3) calculated in step S2, in response to a determination that a preset standard requirement is met, proceeding with winding, and in response to a determination that the preset standard requirement is not met, performing an adjustment until the preset standard requirement is met; and step S8: after finishing winding, fixing a tail end of the coil (4) eventually formed on a preceding layer of the coil (4) to complete the coil (4).

2. The method for winding the foil to form the coil as claimed in claim 1, wherein the winding die in step S1 comprises a left die, a middle die and a right die, and the middle die is connected between the left die and the right die.

3. The method for winding the foil to form the coil as claimed in claim 1, wherein the interval in step S3 is ranged from 50 mm to 100 mm.

4. The method for winding the foil to form the coil as claimed in claim 1, wherein the reference point (6) in step S5 is arranged at a start end of the coil (4) eventually formed.

5. The method for winding the foil to form the coil as claimed in claim 1, wherein the standard requirement in step S7 is ranged from 0 mm to 3 mm.

* * * * *